United States Patent [19]

Brueck et al.

[11] 4,220,510
[45] Sep. 2, 1980

[54] METHOD FOR SEPARATING ISOTOPES IN THE LIQUID PHASE AT CRYOGENIC TEMPERATURE

[75] Inventors: Steven R. J. Brueck, Acton; Richard M. Osgood, Jr., Winchester, both of Mass.

[73] Assignee: Massachusetts Institute of Technology, Cambridge, Mass.

[21] Appl. No.: 924,345

[22] Filed: Jul. 13, 1978

Related U.S. Application Data

[63] Continuation of Ser. No. 711,714, Feb. 24, 1977, abandoned.

[51] Int. Cl.² .............................................. B01J 1/10
[52] U.S. Cl. ..................... 204/157.1 R; 204/DIG. 11
[58] Field of Search ................. 204/157.1 R, DIG. 11

[56] References Cited

U.S. PATENT DOCUMENTS

| | | | |
|---|---|---|---|
| 4,032,419 | 6/1977 | Bernstein | 204/DIG. 11 |
| 4,049,515 | 9/1977 | Robinson et al. | 204/DIG. 11 |
| 4,107,536 | 8/1978 | Peters | 204/DIG. 11 |

*Primary Examiner*—Howard S. Williams
*Attorney, Agent, or Firm*—Arthur A. Smith, Jr.; Paul J. Cook

[57] ABSTRACT

Isotopes are separated from an isotopically mixed molecular dopant dissolved in a cryogenic liquid. The solution is exposed to infrared laser light in order to selectively vibrationally excite a particular molecular species which contains the isotope or isotopes that are to be separated. The excited species then is reacted or dissociated to form recoverable reaction products rich in the isotope desired.

6 Claims, 2 Drawing Figures

$\nu_3$ ABSORPTION BAND OF $SF_6$
Top: T ~ 300 K Gas Phase
Bottom: T ~ 77K Dissolved in liquid Nitrogen
(n ~ 2 ×10$^{15}$cm$^{-3}$, $l$ = 6 cm)

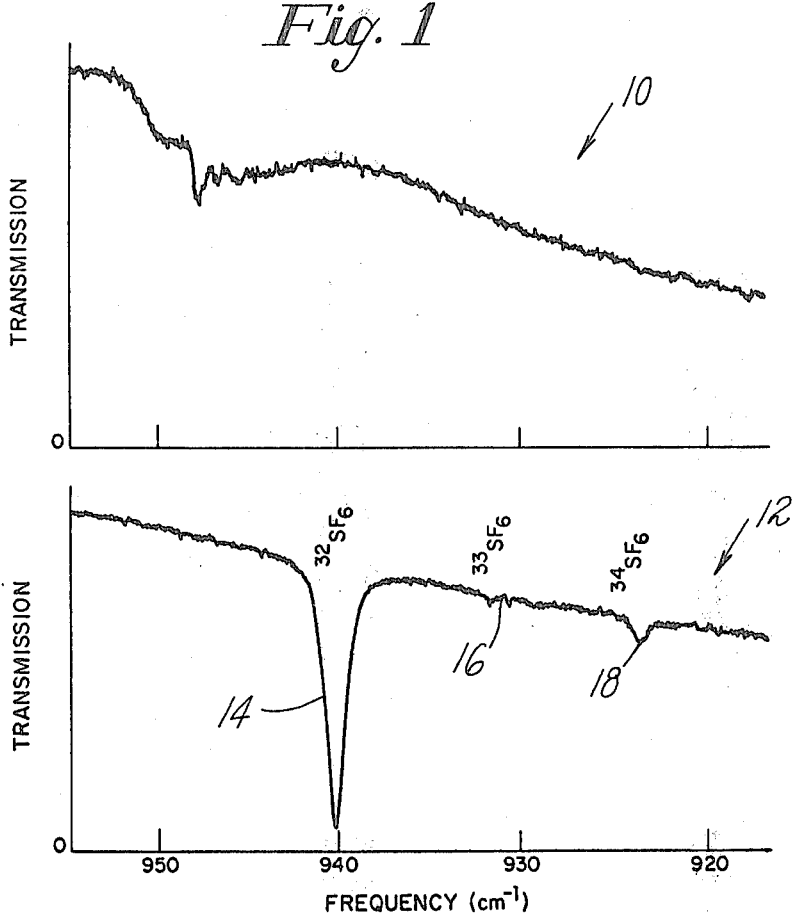
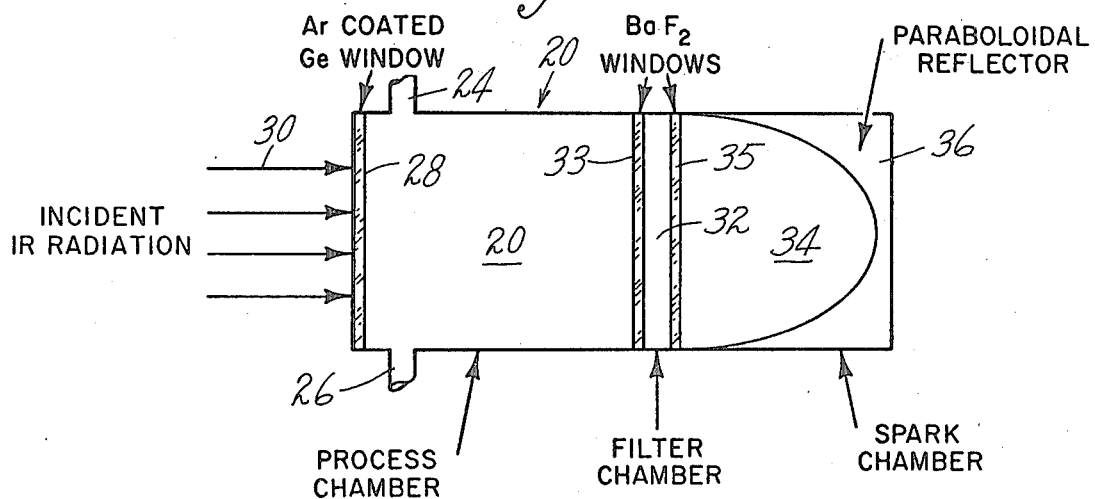

METHOD FOR SEPARATING ISOTOPES IN THE LIQUID PHASE AT CRYOGENIC TEMPERATURE

BACKGROUND OF THE INVENTION

The invention described herein was made in the course of work performed under Contract Number F19628-73-0002 with the Department of the Air Force.

This is a continuation of application Ser. No. 771,714 filed, Feb. 24, 1977, now abandoned.

This invention relates to a method and apparatus for separating a particular isotopic compound from mixtures thereof and more particularly to a method and apparatus for utilizing selective, laser-induced, excitation of a particular isotopic molecule followed by chemical alteration of the excited molecule and then separation.

There are about 60 elements having more than one stable isotope occurring naturally. Various isotopes are extremely useful as tracers in a wide variety of applications. For example, some elements have both radioactive and nonradioactive isotopes which can be used respectively as tracer elements for studying various body functions, as well as comprising a useful diagnostic tool in medicine. Thus, oxygen-18 has found extensive use as a nonradioactive tracer in metabolism studies. Similarly, radioactive iodine has been extremely useful as a radioactive tracer in the diagnosis of human thyroid conditions. In addition, several isotopic elements are important for various applications in commercial nuclear power plants. At the present time, the common commercial methods for isolating particular isotopes are extremely expensive which has greatly limited their commercial application.

A wide variety of methods which involve the selective excitation of one of the isotopic compounds with photons from a laser have been proposed for separating isotopes from mixtures thereof. These procedures require an absorption spectrum having a well-resolved isotopic shift, a laser source which excites one isotopic species by absorption of light and not the other isotopes, subsequent physical or chemical separation of the excited isotopic species from the unexcited species, and conditions which prevent energy transfer from the excited isotopes prior to such physical or chemical separation. A number of physical or chemical separation steps have been proposed including photopredissociation, photodissociation or photochemical separation which involved the selective excitation of either the chemical bonds, i.e. electronic excitation, in containing such atomic isotopes in the vapor state or of the nuclear motion of such isotopic species such as in vibrational excitation of the nucleii. However, for many molecules, the techniques of the present state of the art have not resulted in the requisite degree of isotope separation, the required volume scalability, or a practical level of throughput sufficient to provide a commercial incentive for its utilization.

As set forth above, laser isotope schemes all require that the spectra of the various isotopic species be sufficiently resolved so that selective laser excitation can be used to obtain different reaction rates or dissociation rates for the various isotopic species. For heavy complex molecules in the gas phase, this requirement is difficult to satisfy. For practical operating temperatures, the infrared vibrational spectra of such molecules is often complicated by the presence of "hot bands" and rotational substructure. This complexity effectively broadens the infrared spectra and makes it impossible to utilize the slight isotopic shift in molecular infrared absorption bands as a means of effective selective vibrational excitation of one isotopic species. In principal, the extent of both hot band absorption and the amount of the rotational substructure may be reduced by cooling the molecules, since both effects result from thermal excitation of both vibrational and rotational levels. However, simple static cooling is not a useful technique for simplifying the spectra in many cases, due to the impractically low vapor pressures of heavy molecules at the low temperature needed to allow the necessary simplification of the spectra. Fluid dynamic cooling of the isotopic species may also not be desirable since these techniques involve complex gas handling apparatus which represent a significant contribution to the expense and energy requirements of a laser isotope separation process.

SUMMARY OF THE INVENTION

In accordance with this invention, molecules containing the isotopes to be separated are dissolved in a cryogenic liquid at a temperature less than about 100° K., thereby substantially reducing the rotational absorption bands and the hot bands of the dissolved molecules. The dissolved molecules are then irradiated with an infrared laser to effect selective laser excitation of a vibrational mode of one predetermined isotopic molecular species. The molecules containing the excited isotope then are dissociated or chemically reacted to form a reaction product containing the isotope previously excited. Reaction or dissociation must be effected between the time of exposure to the infrared laser and the time for either near-resonant vibrational exchange during collisions of excited and unexcited molecules, or de-excitation of the vibrationally excited molecules during collisions with the solute or solvent molecule.

BRIEF DESCRIPTION OF THE DRAWINGS

FIG. 1 shows the $\nu_3$ vibrational absorption bands of $SF_6$ in the gas phase and of $SF_6$ dissolved in liquid nitrogen.

FIG. 2 is a side view of an apparatus useful for conducting the process of this invention.

DESCRIPTION OF SPECIFIC EMBODIMENTS

In conducting the process of this invention, a compound comprising a mixture of isotopically mixed molecules is dissolved in a cryogenic liquid to form a solution of the compound having a temperature less than about 100° K. The maximum concentration of the isotopic mixture is determined by the solubility of the dopant molecule in the cryogenic liquid at the temperature of the solution. In any event, the density of the solute molecules obtainable by solution in a cryogenic liquid at these low temperatures can be generally greater by about three orders of magnitude than that obtainable in the vapor phase of the same solute molecules at comparable or even higher temperatures. Without the solvent, a molecular concentration comparable to that obtainable in the cryogenic liquid would condense or solidify out of the vapor phase and not be useful for the subject isotope separation scheme. For example, at 77° K., the maximum $SF_6$ density which can be introduced into a cooled cell in the gas phase is approximately $10^{13}$ molecules per cc. However, solution of $SF_6$ in liquid $N_2O_2$ and Ar at densities greater than $2 \times 10^{19} \text{ cm}^{-3}$ have been observed. Precise determination of the solubilities of the solutes is a difficult problem; however, they can be estimated from Equation 1 for ideal solutions:

$$\ln X = \frac{\Delta H_f}{R}\left(\frac{1}{T_1} - \frac{1}{T}\right) \quad (1)$$

wherein X is the saturated mole fraction of solute, $\Delta H_f$ is the latent heat of fusion of the solute molecule, $T_1$ is the melting temperature of the solute molecule and T is the solvent temperature. For $SF_6$, $\Delta H_f = 5$ kJ/mole at $T_1 = 263°$ K., $X = 6 \times 10^{-3}$ at $77°$ K. which corresponds to a limiting $SF_6$ density of $10^{20}$ cm$^{-3}$.

In this invention, one or more dopant compounds containing the isotopically mixed molecules are added to the cryogenic host. The dopant molecules are made reactive or dissociable by virtue of a laser-induced excitation of either vibrational or electronic energies of the dopant molecules. After reaction or dissociation the products can then be easily separated from the isotopic molecules not excited by the excitation frequency of the laser employed. Two-photon infrared absorption processes may also be used with infrared laser excitation to preferentially excite the desired isotopic species. The reaction or dissociation products then can be separated from the treated solution by conventional means such as by fractional distillation.

Dissociation or reaction of the selectively excited isotopic species can be effected by any one of a wide variety of means. In one embodiment, the selectively excited isotopic species is exposed to an ultraviolet photon which has sufficient energy to dissociate the vibrationally excited molecule. but not the ground state molecules of the other isotopic species to accomplish selective dissociation. Since the infrared spectra of the various isotopes in the cryogenic liquid is sufficiently distinct, preferential two step dissociation utilizing an infrared plus an ultraviolet photon is a practical means for accomplishing the selective dissociation. In an alternate embodiment, a second molecular species in addition to the isotopically mixed dopant can be dissolved in the cryogenic liquid. This second molecular species then reacts selectively with the vibrationally excited molecules of the isotopically mixed dopant. Reaction of the vibrationally excited dopant molecules with the solvent molecules is another approach to this embodiment.

For both embodiments, the solution containing the isotopic species is exposed to an infrared laser beam which excites a particular vibrational mode of one of the isotopic species to be separated without exciting the vibrational mode of the other isotopic species. This selective excitation may be accomplished because of the isotopically sensitive nature of the vibrational-rotational infrared spectrum of molecular species. Specifically, because of the small mass difference between isotopic species, the vibrational-rotational spectra is slightly shifted in wavelength from one species to another. If the spectra of these species are sufficiently not overlapping, absorption of single frequency laser light can result in excitation of predominantly one isotopic species.

Dissolving large molecules in a cryogenic liquid results in a narrowing of the vibrational-rotational spectra and reduces the possibility of spectral overlap of two isotopic species. This spectral sharpening results from two effects: (1) reduction in the population of low lying vibrational modes (thereby eliminating so-called hot bands absorption) at cryogenic temperatures; and (2) collisional narrowing of the rotational sub-structure within a given vibrational band.

Infrared molecular excitation processes in which two photons are simultaneously absorbed by a single molecule are also simplified and narrowed in the liquid environment. There are two components to this two-photon absorption process dependent upon the polarization vector of the infrared radiation. The perpendicular component (two photons polarized perpendicular to each other) has a width comparable to the single-photon infrared absorption band and is narrowed in the liquid medium as discussed above. The parallel component (both photons polarized in the same direction) of the two-photon absorption band is much narrower since it is only weakly coupled to the rotational motion of the molecules by the rotation-vibration interaction. Thus, the collisional narrowing process is more effective for this parallel component and extremely narrow spectral features can result. For example, for liquid $N_2$, the perpendicular component of the two-photon absorption is approximately 30 cm$^{-1}$ wide while the parallel component is only 0.067 cm$^{-1}$ wide.

FIG. 1 illustrates the narrowing of the infrared vibration-rotation bandshape for the $\nu_3$ mode of $SF_6$ dissolved in liquid nitrogen. The top graph 10 shows the infrared spectrum of the vibrational absorption band of $SF_6$ which was measured at $300°$ K. in a 6 cm path length and at a pressure of 0.060 Torr. The complex structure shown is due to rotational effects and also to hot bands. The bottom graph 12 gives the spectrum, for the identical concentration and path length, of $SF_6$ dissolved in liquid nitrogen. The spectrum has narrowed dramatically with a linewidth of 0.5 cm$^{-1}$ in the liquid. The strong absorption band 14 at 940 cm$^{-1}$ is due to the dominant $^{32}SF_6$ isotopic species. The red shift of 8 cm$^{-1}$ from the gas phase band center is due to the solvent effects of liquid nitrogen and varies slightly for different solvents (e.g. $O_2$, Ar, CO). The weaker absorption lines 16 and 18 at 932 cm$^{-1}$ and 923 cm$^{-1}$ are due to $^{33}SF_6$ and $^{34}SF_6$ which are present in their natural isotopic abundances of 0.76% and 4.22% respectively. The very weak $^{33}SF_6$ absorption band which is barely visible in this spectrum can be clearly seen at higher $SF_6$ concentrations. In the gas phase infrared spectrum 10 of naturally occurring $SF_6$, it is not possible to observe the $^{33}SF_6$ absorption band because of the $^{32}SF_6$ absorption band. The well resolved isotopic structure 12 permits isotope separation based on the selective infrared excitation of a single isotopic species.

The laser to be used in the process of this invention obviously depends upon both the chemical and spectroscopic nature of the isotopic species desired to be separated. For example, a chemical reaction or ultraviolet dissociation may often be induced most easily by excitation of only a particular mode of a polyatomic molecule. Therefore, it is necessary to select a specific laser, the output wavelength of which coincides with the excitation frequency of a specific vibrational mode in a particular isotopic species. The correct laser source may be a stepwise tunable infrared laser such as $CO_2$, HF, DE, CO, etc. or a tunable infrared laser source such as a very high pressure $CO_2$ laser. For example, in the case of the $^{32}SF_6$ molecule mentioned above, the P(26) line (at 10.6 $\mu$m) of the $CO_2$ laser can be used to excite the $^{32}SF_6$ $\nu_3$ mode preferentially.

Representative suitable cryogenic liquids useful as solvents include nitrogen, oxygen, argon, methane, ammonia, carbon monoxide, Xe, Kr or Ne or mixtures thereof. Any compound which can be dissolved in the cryogenic liquid can be treated to isolate a specific isotopic species. Representative compounds which can be processed in accordance with this invention include $CO$, $NO$, $CO_2$, $N_2O$, $OCS$, $O_3$, $C_2H_2$, $CH_4$, $CD_4$, $CF_4$, $CCl_2F_2$, $SiH_4$, $SF_6$, $C_2H_6$ and $SiF_4$ among others.

The cryogenic solution containing the isotopically mixed molecules is maintained in a cold chamber at a temperature of less than about 100° K. The chamber is provided with a window made from a material which is transparent to the infrared laser at a frequency range within which one isotopic species is selectively vibrationally excited. The excited isotopic species then is converted either by chemical reaction or by dissociation to a product which can be separated either physically or chemically from the unexcited, unconverted isotopic species. However, reaction and/or dissociation of the excited isotopic species by the ultraviolet photons must be accomplished before the increased vibrational energy of the excited species has been scrambled by near resonant vibrational exchange processes with the unexcited isotopic species or has been dissipated by collision with the liquid solvent molecules. These processes have been found to occur with rate coefficients comparable to those of gases at the same temperatures. The former process may be reduced by lowering the density of the molecular species in question. The latter process may be rendered less significant by irradiating the molecule species with a laser intensity sufficient to overwhelm the deactivation rate. It is then necessary to scale the ultraviolet flux or reactant pressure accordingly. In addition, purification of the cryogenic liquid is known to reduce the deactivation rate. It also is known that some types of liquids have an inherently slower deactivation rate and thus may be more desirable solvents.

One means for accomplishing the infrared-ultraviolet two step exposure embodiment is shown in FIG. 2. The apparatus 20 includes a cold chamber 22 to house a mixture of isotopic species dissolved in a cryogenic liquid provided with an inlet 24 and an outlet 26. The cold chamber 22 is provided with a window 28 such as antireflection coated germanium or zinc selenide which is selectively transparent to infrared radiation 30. A filter chamber 32 is positioned between cold chamber 20 and spark chamber 34. Filter chamber 32 is subtended by two windows 33 and 35 formed of a material which is transparent to both infrared and ultraviolet radiation such as barium fluoride, calcium fluoride or sapphire. Spark chamber 34 is provided with parabolic reflector 36. In use, the cryogenic liquid solution in cold chamber 20 is exposed to infrared radiation 30 which selectively excites one isotopic species and produces a breakdown spark in chamber 34 after being focused by the parabolic reflector 36. The ultraviolet photons of the spark are collimated by parabolic reflector 36 and pass through windows 33 and 35 and UV filter chamber 32 into cold chamber 20 to induce selective dissociation of the vibrationally excited isotopic species. In this embodiment, the cryogenic liquid employed should not absorb the reflected ultraviolet photons in preference to the excited isotopic species. For example, vibrationally excited carbonyl sulfide in liquid oxygen is not dissociated by ultraviolet radiation since the UV cutoff of liquid oxygen is about 290 nm which is below the UV edge of the carbonyl sulfide. However, vibrationally excited carbonyl sulfide is dissociated by UV radiation in liquid nitrogen.

Alternatively, an ultraviolet laser such as ArF, KrF, $Xe_2$, $Br_2$, XeBr, etc. at an appropriate wavelength may be used in place of the spark source to provide the UV photons necessary for dissociation. In this embodiment, provision must be made to time the infrared and ultraviolet lasers so that they operate simultaneously.

In the second embodiment, a second compound in addition to the isotopic mixtures can be dissolved in the cryogenic liquid which reacts selectively with the vibrationally excited molecules. For example, boron trichloride and hydrogen sulfide can be dissolved in liquid argon to separate the various chlorine isotopes or the boron isotopes. The vibrationally excited boron trichloride reacts with hydrogen sulfide to form various boron and sulfur compounds which can then be selectively recovered from the solution such as by fractional distillation, thereby isolating the desired isotope.

What is claimed is:

1. A process for separating isotopes from an isotopic mixture of a compound dissolved in a cryogenic liquid at a temperature less than about 100° K., which comprises exposing the solution to infrared laser radiation having a radiation frequency that causes excitation of the vibrational energy of a first isotopic molecule of said mixture without exciting the vibrational energy of molecules containing other isotopic forms in said mixture, reacting the compounds containing said vibrationally excited isotopic molecules with a second compound in said liquid or dissociating the compounds containing said vibrationally excited isotopic molecules and separating the products of said reaction or dissociation containing said first isotopic molecules.

2. The process of claim 1 wherein the selective vibrational excitation is accomplished by means of a two-photon absorption band.

3. The process of claim 1 wherein said compound containing the vibrationally excited isotope is reacted with a second compound dissolved in said cryogenic liquid.

4. The process of claim 1 wherein dissociation of said vibrationally excited molecule is effected by exposure to ultraviolet radiation.

5. The process of claim 4 wherein said ultraviolet radiation is generated by exposure of said solution to said laser light.

6. The process of claim 4 wherein said cryogenic liquid is exposed simultaneously to said infrared radiation and said ultraviolet radiation wherein said laser radiation and said ultraviolet radiation are generated from separate sources.

* * * * *